United States Patent [19]

Padget et al.

[11] Patent Number: 5,021,544

[45] Date of Patent: Jun. 4, 1991

[54] POLYESTER POLYMERS AND AQUEOUS DISPERSIONS THEREOF

[75] Inventors: John C. Padget, Frodsham; David A. Pears, Chester, both of United Kingdom

[73] Assignee: Imperial Chemical Industries PLC, London, England

[21] Appl. No.: 431,637

[22] Filed: Nov. 6, 1989

[30] Foreign Application Priority Data

Nov. 4, 1988 [GB] United Kingdom ............... 8825814

[51] Int. Cl.$^5$ ............................................. C08G 63/20
[52] U.S. Cl. ................................... 528/272; 528/274; 528/285; 528/289; 528/295; 528/296; 528/300; 528/301; 528/303; 528/306; 528/308; 525/437; 525/444; 525/445; 525/921; 524/602; 524/603; 524/604; 524/608; 524/609; 522/6; 522/86; 522/100; 522/111
[58] Field of Search ............. 528/272, 274, 285, 289, 528/295, 296, 300, 301, 303, 306, 308; 525/437, 444, 445, 921; 524/602, 603, 604, 608, 609; 522/6, 86, 100, 111

[56] References Cited

U.S. PATENT DOCUMENTS

| 3,899,611 | 8/1975 | Hall ......................................... 427/54 |
| 4,097,677 | 6/1978 | Emmons et al. ..................... 560/220 |
| 4,287,039 | 9/1981 | Buethe et al. ..................... 204/159.19 |
| 4,532,296 | 7/1985 | Gardner ................................. 525/48 |

*Primary Examiner*—John Kight, III
*Assistant Examiner*—S. A. Acquah
*Attorney, Agent, or Firm*—Cushman, Darby & Cushman

[57] ABSTRACT

A water dispersible polyester polymer is described having one or more polyester chains and one or more non-ionic polyoxyalkylene chains in which at least 40% of the repeating oxyalkylene units are oxyethylene units. The polyester polymer has a structure in which one or more of the polyoxyalkylene chains are pendent to at least one of the polyester chains. The poloxyalkylene chains provide the polyester with non-ionic stabilization enabling the polyester to form aqueous dispersions which possess good colloid stability.

36 Claims, No Drawings

POLYESTER POLYMERS AND AQUEOUS DISPERSIONS THEREOF

The present invention relates to water dispersible polyesters and to aqueous polyester dispersions derived therefrom.

The synthesis of polyesters is well known and many methods are available therefor. Polyesters are typically prepared by the reaction of dicarboxylic acids or esterifiable derivatives thereof, e.g. esters, carbonyl chlorides, salts or anhydrides, with diols or their esterifiable derivatives, e.g. cyclic ethers, diacyl esters or dihalides. Such reactions provide the basic polyester chain structure.

Other useful monomers in polyester synthesis include polyfunctional monomers which comprise three or more functional groups capable of participating in a polyester condensation reaction. Suitable monomers in this realm include tricarboxylic acids and higher polycarboxylic acids, trihydric alcohols and higher polyhydric alcohols and compounds which comprise three or more esterifiable functional groups selected from both carboxyl and hydroxyl, for example, polyhydroxy-monocarboxylic acids. Further monomers which may be used in the synthesis of polyesters are known to those skilled in the art and include monohydroxy-monocarboxylic acids, mono-carboxylic acids, mono-hydroxy compounds and ethylenically unsaturated dicarboxylic acids.

Examples of aqueous polyester dispersions are known to the art. The dispersion of polyesters in aqueous mediums has been achieved by the use of dispersing or emulsifying agents such as non-ionic or ionic surfactants. However, the use of a surfactant-stabilised aqueous polyester dispersion is far from ideal, since a proportion of free surfactant may be carried through to the final polyester product, which in some applications detracts from the resulting product properties.

To overcome these disadvantages the use of polyesters which are self-dispersible in aqueous-based systems has been investigated; such polyesters comprise ionic dispersing groups, particularly anionic salt groups such as carboxylate salt groups.

Hitherto, aqueous dispersions of polyesters have tended to be unstable towards increases in temperature, changes in pH and the addition of ions.

U.S. Pat. No. 4,287,039 discloses radiation curable aqueous dispersions comprising an ethylenically unsaturated prepolymer, a dispersant and a photoinitiator. Polyester prepolymers are disclosed, and as monomers for the synthesis thereof there are mentioned polyethylene glycols. Such monomers would only provide a polyester with in-chain polyethylene chains which contribute little to the colloid stability of the polyester, and further, tend to downgrade the water resistance of a polyester coating. That in-chain polyethylene chains contribute little to the stabilisation of the polyester in the aqueous dispersion is evident from the fact that the aqueous dispersions disclosed in U.S. Pat. No. 4,287,039 require the use of a polymeric dispersant.

We have now devised a polyester comprising chemically incorporated, internally stabilising, non-ionic chains which is capable of being dispersed in water without the addition of an external surfactant. The water-dispersible polyesters of the invention are capable of forming aqueous dispersions which exhibit good colloid stability in the presence of added ions, and towards changes in pH. The aqueous polyester dispersions may also exhibit good freeze-thaw stability and temperature stability, and further, may be used to produce coatings of good water stability.

According to the present invention there is provided a water dispersible polyester polymer comprising one or more polyester chains and one or more non-ionic polyoxyalkylene chains in which at least 40% of the repeating oxyalkylene units are oxyethylene units, said polyester polymer having a structure in which one or more of the polyoxyalkylene chains are pendent to at least one of the polyester chains.

There is further provided according to the present invention an aqueous, at least non-ionically stabilised, dispersion of a polyester polymer as defined above.

The polyester of the invention may comprise polymerised units derived from any of those esterifiable monomers that are conventionally used in polyester synthesis.

Examples of dicarboxylic acids and their esterifiable derivatives which may be used in the synthesis of the polyester include aliphatic dicarboxylic acids and esters thereof, cycloaliphatic dicarboxylic acids and esters thereof, and aromatic dicarboxylic acids and esters thereof. Specific examples of useful dicarboxylic acids include, inter alia, orthophthalic acid, terephthalic acid, isophthalic acid, phthalic acid, tetrahydrophthalic acid, hexahydrophthalic acid, succinic acid, sebacic acid, adipic acid, azelaic acid, glutaric acid, pimelic acid and suberic acid.

Suitable diols (dihydroxy alcohols) which may be employed include aliphatic diols, for example, alkane diols, i.e. alkylene glycols. Some representative examples of alkylene glycols are ethylene glycol, propylene glycol, butylene glycol, neopentyl glycol, trimethylene glycol, 1,5-pentane diol and 1,6-hexane diol. Further useful diols include alicyclic diols, aralkylene diols and arylene diols.

The polyester of the invention preferably comprises a plurality of polyester chains bonded together to form a branched polyester structure. Accordingly, in preferred embodiments at least one of the monomers which is used to form the polyester of the invention is a chain branching monomer comprising three or more esterifiable functional groups. Particularly suitable monomers in this realm are the tri- and higher poly-carboxylic acids, and the tri and higher poly-hydric alcohols.

Examples of polycarboxylic chain branching monomers include, inter alia, trimellitic acid, trimesic acid, pyromellitic acid, butanetetracarboxylic acid, naphthalene tricarboxylic acids and cyclohexane-1,3,5-tricarboxylic acid.

As examples of polyhydroxy chain branching monomers (polyols) one may mention glycerin, trimethylolethane, trimethylolpropane, trimethylolbutane, pentaerythritol, 1,2,6-hexanetriol, 1,3,5-trimethylol benzene, sorbitol, mannitol and etherification products of tri and higher polyols, for example, di-, tri-, tetra- and polypentaerythritol.

As further examples of monomers which may be used in the synthesis of the polyester of the invention one may mention monohydroxy-monocarboxylic acids, mono-carboxylic acids, mono-dydroxy compounds and ethylenically unsaturated monomers having one or more esterifiable functional groups which maintain their ethylenic unsaturation during the polyesterification reaction.

Further monomers which have been used in the synthesis of prior art polyesters and which may be employed in the synthesis of the polyester of the invention are well known to those skilled in the art.

By a polyester chain we are not referring exclusively to polymer chains in which all the adjacent monomer units are bonded together through carboxylate ester linkages, but to polymer chains in which at least 50%, preferably at least 80%, more preferably at least 90%, for example all, of the linkages bonding the monomer units together are carboxylate ester linkages. In particular, certain of the monomer units may be bonded into the polyester chain by linkages which are also formed during the reaction to form the polyester, providing the proportion of such other linkages does not exceed 50%. Examples of such other linkages are amide and thioester linkages.

By a polyoxyalkylene chain, we mean a chain which comprises repeating oxyalkylene units of general formula $-(O-CHR-CH_2)-$, where R in a given oxyalkylene unit represents hydrogen, methyl or ethyl, providing that at least 40%, preferably at least 60%, and more preferably at least 80% of the oxyalkylene units (by number) are oxyethylene units where R in the above formula is hydrogen.

The polyester of the invention may comprise a single polyester chain onto which is attached by chemical means one or more pendent polyoxyalkylene side chains.

Alternatively, the polyester of the invention may comprise a plurality of polyester chains bonded together to form a branched polyester structure in which at least one of said polyester chains is provided with at least one polyoxyalkylene chain as defined supra. In this embodiment, the polyoxyalkylene chain(s) may be pendent to the polyester chain by virtue of direct chemical bonding thereto, so that it forms a side chain(s) of the polyester chain (direct pendency). Alternatively, the polyester may comprise at least one polyoxyalkylene chain which is attached on the end of a polyester chain, rather than being pendent thereto as a side chain, but this polyester chain is itself pendent to another polyester chain by virtue of the branched structure of the polyester polymer, so that the polyoxyalkylene chain(s) is indirectly pendent to a polyester chain (indirect pendency). The polyester of the invention may also comprise both directly and indirectly pendent polyoxyalkylene chains.

The polyoxyalkylene chain may be incorporated into the polyester by employing as a monomer in the synthesis thereof a monomer comprising at least two esterifiable functional groups and a pendent polyoxyalkylene chain. Therefore, in this embodiment the polyoxyalkylene chain(s) is incorporated during the polyesterification, by employing at least one monomer which comprises two or more, but preferably two, esterifiable functional groups and a pendent polyoxyalkylene chain. Examples of suitable monomers which may be employed to introduce the polyoxyalkylene chain(s) include dicarboxylic acids comprising a pendent polyoxyalkylene chain, and dihydric alchols comprising a pendent polyoxyalkylene chain. Other useful monomers may include monohydroxy-monocarboxylic acids comprising a pendent polyoxyalkylene chain.

Alternatively, the monomer bearing the polyoxyalkylene substituent may comprise carboxyl reactive functional groups other than hydroxyl groups, for example, amine and/or thiol groups. Suitable monomers in this realm may include diamines bearing a pendent polyoxyalkylene chain.

By an esterifiable functional group is meant a group capable of taking part in a reaction to form an ester; i.e. hydroxyl and carboxyl groups as well as derivatives thereof which are also esterifiable functional groups (hereinafter referred to for convenience as esterifiable derivatives). By an esterifiable monomer is meant a monomer comprising at least one esterifiable functional group.

However, in preferred embodiments, the polyester of the invention is prepared by means of a multi-step process comprising at least the steps (A) preparing a polyester precursor polymer having one or more reactive functional groups, and (B) incorporation of the polyoxyalkylene chain(s) by reacting the polyester precursor polymer with a compound having a polyoxyalkylene chain and a reactive functional group which is co-reactive with the reactive functional group(s) of the polyester precursor polymer.

In particularly preferred embodiments, the polyester of of the invention is prepared from an ethylenically unsaturated polyester precursor polymer having one or more ethylenically unsaturated groups, by means of a Michael addition reaction in which the ethylenically unsaturated polyester precursor polymer is reacted with a compound(s) containing a polyoxyalkylene chain and a Michael donor group which is co-reactive with the ethylenically unsaturated group(s) of the polyester precursor polymer. The compound comprising the polyoxyalkylene chain and the Michael donor group is preferably a polyetheramine containing oxyalkylene residues.

The ethylenic unsaturation in the polyester precursor polymer may be terminal (i.e. where the ethylenically unsaturated group(s) is arranged on the end of a polyester chain(s)) and/or pendent (i.e. where the ethylenically unsaturated group(s) is a side group appended to a polyester chain(s)) and/or in chain, although where the ethylenic unsaturation in the polyester precursor polymer is exclusively terminal, the polyester precursor polymer must be a branched chain polyester comprising a plurality of polyester chains so bonded together.

An ethylenically unsaturated polyester precursor polymer having pendent and/or in chain ethylenic unsaturation is preferably prepared by employing as at least one of the esterifiable monomers in the polyesterification reaction an esterifiable, ethylenically unsaturated monomer having two or more esterifiable functional groups and an ethylenic double bond which when incorporated in the polyester precursor polymer is capable of undergoing a Michael addition reaction. Useful monomers of this type are the ethylenically unsaturated polycarboxylic acids, especially dicarboxylic acids, or their anhydrides, e.g. fumaric acid, maleic acid and anhydride, mesaconic acid, citraconic acid, trans-trans muconic acid and itaconic acid. Other suitable monomers may include partially (meth)acrylated triols, e.g. partially (meth)acrylated glycerol. Ethylenically unsaturated monomers having two or more esterifiable functional groups are incorporated into the polyester precursor polymer, and provide the polymer with in chain or pendent ethylenic unsaturation depending upon their structure. Ethylenically unsaturated polyester precursor polymers having pendent and/or in chain ethylenic unsaturation can be used to prepare a polyester of the invention by Michael addition of a compound containing a polyoxyalkylene chain and a Michael donor group. The Michael donor compound having the polyoxyalkylene chain will react with the ethylenically unsaturated polyester precursor polymer such that the polyoxyalkylene chain will be pendent to, and form a side chain of, the polyester chain with which it has become attached (i.e. direct pendency).

An ethylenically unsaturated polyester precursor polymer having terminal ethylenic unsaturation may be prepared by employing as at least one of the esterifiable monomers in the polyesterification an ethylenically unsaturated monomer having a single esterifiable functional group, e.g. an ethylenically unsaturated monocarboxylic acid and/or an ethylenically unsaturated monohydric alcohol.

Alternatively, a polyester comprising carboxyl and/or hydroxyl terminal groups (or esterifiable derivatives thereof) may be subjected to a post-functionalisation reaction, in which the terminal groups of the polyester are reacted with at least one ethylenically unsaturated compound having an esterifiable functional group(s), e.g. an ethylenically unsaturated monocarboxylic acid, an ethylenically unsaturated monohydric alcohol or compounds like maleic anhydride.

Examples of ethylenically unsaturated monocarboxylic acids are the $\alpha,\beta$-ethylenically unsaturated acids, such as acrylic acid and methacrylic acid. Other useful ethylenically unsaturated acids are the monocarboxylic acid functionalised acrylates and methacrylates, for example, $\beta$-carboxyethyl acrylate and methacrylate.

Examples of ethylenically unsaturated monohydric alcohols which may be employed are the hydroxyalkyl esters of $\alpha,\beta$-ethylenically unsaturated acids, for example, hydroxyethyl acrylate, hydroxyethyl methacrylate, hydroxypropyl acrylate, hydroxypropyl methacrylate and the like.

Examples of ethylenically unsaturated compounds having an esterifiable functional group other than a hydroxyl or carboxyl group include the alkyl esters of $\alpha,\beta$-ethylenically unsaturated carboxylic acids, e.g. ethyl acrylate and methacrylate, and glycidyl acrylate and methacrylate.

Furthermore, ethylenically unsaturated compounds having hydroxyl reactive or carboxyl reactive functional groups other than an esterifiable functional group may be employed to introduce terminal ethylenic unsaturation.

Especially preferred compounds for introducing terminal ethylenic unsaturation are the hydroxyalkyl acrylamides, in particular N-methylol acrylamide.

Branched polyester precursor polymers comprising a plurality of polyester chains in which at least one of those chains comprises a terminal ethylenically unsaturated group can be used to prepare a polyester of the invention by Michael addition of a compound containing a polyoxyalkylene chain and a Michael donor group. The Michael donor compound having the polyoxyalkylene chain will react with the terminal ethylenic unsaturation forming a polyester of the invention in which the polyoxyalkylene chain(s) is arranged on the end of the polyester chain with which it has become attached. With such a polyester of the invention, the polyoxyalkylene chain will not, of course, be pendent to the particular polyester chain with which it is attached, but will be pendent to at least one of the other polyester chains forming the branched polyester (i.e. indirect pendency).

The ethylenically unsaturated polyester precursor polymer will usually comprise polymerised units derived from saturated esterifiable monomers. These monomers may be selected from any of the esterifiable monomers discussed supra. Especially preferred monomers are the polycarboxylic acids, polyhydric alcohols and mono- and poly- hydroxy-monocarboxylic acids.

Of course, where the ethylenically unsaturated polyester precursor polymer used in the preparation of the polyester of the invention is to comprise exclusively terminal ethylenic unsaturation, then at least one of the monomers which is used in the synthesis thereof must be a chain branching monomer having three or more esterifiable functional groups. Furthermore, notwithstanding the above, the polyester of the invention is preferably a branched polyester, so that even in embodiments where the ethylenically unsaturated polyester precursor polymer is not to comprise exclusively terminal ethylenic unsaturation, at least one of the monomers which is used in the synthesis thereof is preferably a chain branching monomer.

The polyester polymers may be prepared in conventional manner using techniques well known in the art. Typically, this involves heating the monomers in a melt, or in the presence of a solvent, at a temperature in the range 150° C. to 250° C., preferably about 200° C., the eliminated water being removed by distillation, typically distillation under reduced pressure, or by azeotropic distillation using an organic solvent, for example, toluene or xylene. Typically, the polyesterification reaction may be effected in the presence of an esterification catalyst, for example, zirconium naphthenate, antimony (III) oxide or dibutyl tin oxide. Upon completion of the polyesterification the solvents (if used) and any residual water can be removed by distillation to yield the polyester polymer.

The ethylenically unsaturated polyester precursor polymer can then be reacted in a second step, preferably with a polyetheramine(s) comprising oxyalkylene residues, at least 40% of which are oxyethylene residues, to incorporate the pendent polyoxyalkylene chains and yield a polyester of the invention. The reaction may be performed under standard Michael conditions, solvents being employed where necessary.

Particularly preferred polyether amines which comprise oxyalkylene residues may be represented by the general formula:

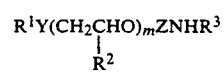    I wherein
R$^1$ is hydrogen or a monovalent hydrocarbon radical containing 1-12 carbon atoms;
R$^2$ is hydrogen or a mixture thereof with methyl and/or ethyl, providing at least 40% of the R$^2$ substituents are hydrogen;
R$^3$ is hydrogen, or a monovalent hydrocarbon radical containing 1 to 12 carbon atoms;
Y is —O— or a group of the formula —N(R$^4$)— in which R$^4$ is hydrogen or a monovalent hydrocarbon radical containing 1-12 carbon atoms;
m is an integer from 5 to 150; preferably 5 to 50; and
Z is an alkylene radical containing 2-4 carbon atoms.

Examples of monovalent hydrocarbon radicals which may be represented by R$^1$, R$^3$ and R$^4$ include C1 to C12 alkyl radicals, C4 to C8 cycloalkyl radicals, C6 to C12 aryl radicals, and C7 to C10 aralkyl radicals. In preferred embodiments R$^1$ is a C1 to C4 alkyl radical, especially methyl, and R$^3$ is hydrogen.

Where Y is a group of the formula —N(R⁴)—, R⁴ may be the same as or different to the group represented by R¹. Preferably Y is an oxygen atom.

The identity of R² is such that the —CH₂CHR²O— units are oxyethylene units or a mixture of oxyethylene units with oxypropylene and/or oxybutylene units, at least 40% of the units in the said mixture being oxyethylene. When a mixture of such units is present, they may be randomly distributed or arranged in blocks. Preferably at least 60%, more preferably at least 80%, of the oxyalkylene units are oxyethylene units.

The alkylene radical represented by Z may be an ethylene, trimethylene or butylene radical but is preferably a 1,2-propylene radical wherein the secondary carbon atom is attached to the nitrogen atom.

Certain primary amines of Formula I are commercially available. Examples of such amines wherein Z is 1,2-propylene, Y is oxygen and R³ is hydrogen are the Jeffamine polyoxyalkylene amines available from the Texaco Chemical Company. Amines where Z is trimethylene, Y is oxygen and R³ is hydrogen may be obtained by the cyanoethylation of polyalkylene glycol mono-ethers followed by hydrogenation.

The polyalkylene glycol monoethers which may be used to prepare certain polyether amines of Formula I, may be prepared in known manner by reacting ethylene oxide or a mixture thereof with propylene and/or butylene oxide with monohydric alcohols or monohydric phenols of the general formula R¹—OH where R¹ represents a monovalent hydrocarbon radical containing 1 to 12 carbon atoms. The number of alkylene oxide units which is grafted onto the monohydric alcohol or phenol may vary within wide limits as denoted by the integer m. Suitable alcohols or phenols that may be used include, inter alia, methanol, ethanol, n-propanol, isopropanol, tertiary butanol, benzyl alcohol, phenol and the like.

Polyalkylene glycol monoamines which may be used to prepare certain polyether amines of Formula I, may be obtained by oxyalkylating amines of the general formula R¹—NHR⁴. Suitable amines include, for example, secondary amines such as dimethylamine, diethylamine, dipropylamine and the like.

According to a preferred aspect of the present invention there is provided a process for preparing a water dispersible polyester polymer comprising one or more polyester chains and one or more non-ionic polyoxyalkylene chains in which at least 40% of the repeating oxyalkylene units are oxyethylene units, said polyester polymer having a structure in which one or more of the polyoxyalkylene chains are pendent to at least one of the polyester chains, said process comprising at least the steps of:

(A) preparing a polyester precursor polymer having ethylenic unsaturation which is capable of participating in a Michael addition reaction; and (B) reacting the ethylenically unsaturated polyester precursor polymer under appropriate Michael addition reaction conditions with at least one polyether amine of Formula I.

The pendent polyoxyalkylene chain content of the polyester may vary within wide limits. Typically, the polyester of the invention is comprised of from 1 to 40% by weight, preferably from 2 to 25% by weight, of a pendent polyoxyalkylene chain(s) based on the weight of the polyester chain(s). If the weight of the polyoxyalkylene chain portion is below 1%, then the required non-ionic stabilisation may not be provided, while weights in excess of 40% may deleteriously affect the properties of the polyester.

In preferred embodiments, the polyester of the invention additionally comprises acid groups, such as carboxylic acid groups and/or sulphonic acid groups, arranged as side groups bonded to the polyester chain(s). Particularly suitable acid groups are carboxylic acid groups, since these tend to enhance the adhesion of a polyester film to a substrate. The presence of acid groups in the polyester of the invention also provides distinct advantages where the polyester is to be used as a component in an aqueous printing composition, since the polyester may be removed from the printing heads by means of a basic wash, for example, an aqueous ammonia solution, or an aqueous solution of an alkali metal hydroxide, which converts the acid groups to anionic salt groups enabling the polyester to be dissolved in the aqueous medium.

The carboxylic acid side groups are preferably introduced by employing in the polyester synthesis at least one monomer having two or more functional groups which will readily undergo an ester condensation reaction (i.e. carboxyl groups, hydroxyl groups or esterifiable derivatives thereof), and one or more carboxylic acid groups which, under appropriate conditions, are more difficult to esterify. For example, the carboxylic acid content may be introduced into the polyester by employing as a component in the synthesis thereof, at least one monomer having at least one carboxylic acid group, and at least two hydroxyl groups which are more reactive than the carboxylic acid group(s) in the polyester condensation reaction. Preferred examples of such compounds are the carboxyl group containing diols and triols, for example, dihydroxy alkanoic acids of the formula:

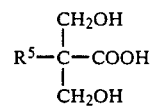

wherein R⁵ is hydrogen or alkyl. The preferred carboxy containing diol is 2,2-dimethylolpropionic acid in which R⁵ in the above formula is a methyl group. Providing the temperature employed in the polyesterification does not rise above about 180° C., the sterically hindered carboxyl group in 2,2-dimethylol-propionic acid should not take part in the polyesterification reaction.

Other useful carboxyl group containing compounds which may be used to introduce carboxyl side groups into the polyester of the invention, include the mono alkali metal salts of benzene tricarboxylic acids, for example, the alkali metal salt of 1,2,4-benzene tricarboxylic acid which has the structural formula:

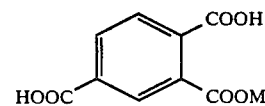

wherein M is sodium, lithium, or potassium, especially lithium.

Another particularly useful carboxyl containing compound which may be employed to introduce carboxyl side groups into the polyester is trimellitic anhydride which has the structural formula:

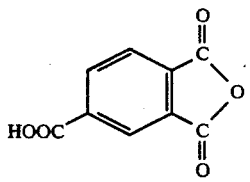

Sulphonic acid side groups are preferably introduced by employing in the polyesterification at least one monomer which comprises at least two esterifiable functional groups (i.e. carboxyl groups, hydroxyl groups or esterifiable derivatives thereof) and at least one sulphonic acid group. Preferably, the sulphonic acid containing monomer is a dicarboxylic acid having at least one sulphonic acid salt group substituent, or a diol having at least one sulphonic acid salt group substituent. For example, particularly suitable sulphonic acid containing monomers are the aromatic dicarboxylic acids containing at least one sulphonic acid salt group substituent. Alternatively, alkyl ester groups may be used in place of the carboxylic acid groups. Examples of such compounds are those of the formula:

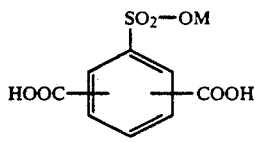

wherein M is sodium, lithium or potassium.

Other useful sulphonic acid containing monomers are the alkali metal salts of sulphonic acid substituted aromatic dicarboxylic acid-dihydroxyalkylesters which have the structural formula:

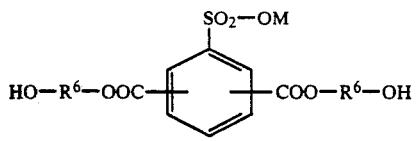

wherein M is sodium, potassium or lithium, and $R^6$ is an alkylene radical.

The acid group content is suitably in the range from 5 to 100 milligrams of KOH per gram of polyester polymer, preferably in the range 20 to 80 milligrams of KOH/g.

The presence of carboxylic acid and/or sulphonic acid side groups in the polyester of the invention provides a further advantage, in that at least a proportion may (if desired) be converted into anionic salt groups (i.e. carboxylate and/or sulphonate groups), which will tend to assist the formation of an aqueous polyester dispersion. The conversion of any carboxylic acid and/or sulphonic acid groups (if present) to anionic salt groups may be effected by neutralising the said acid groups before, after or simultaneously with formation of an aqueous dispersion of the polyester, to form carboxylate and/or sulphonate ions which are associated with appropriate salt forming counter ions. Suitable bases which may be employed to neutralise the acid groups (if present) include alkali metal hydroxide solutions, various amines or ammonia. The carboxylic and/or sulphonic acid groups (where present) are preferably neutralised with an amine prior to dispersion in water. The preferred anionic salt (dispersing) groups are carboxylate groups.

In particularly preferred embodiments, the polyester of the invention additionally comprises ethylenic unsaturation which is capable of undergoing a radiation induced polymerisation reaction and effecting cross-linking in the polyester. Procedures for introducing ethylenic unsaturation have already been discussed supra in connection with the preferred route for preparing the polyester of the invention by Michael addition of compound having a polyoxyalkylene chain to an ethylenically unsaturated polyester precursor polymer. Accordingly, a particularly preferred method for producing a polyester of the invention having ethylenic unsaturation is to react a polyester precursor polymer having ethylenic unsaturation with a Michael donor compound having a polyoxyalkylene chain in such proportions that a portion of the ethylenic unsaturation remains after the Michael addition reaction. Preferably at least a proportion of the ethylenic unsaturation should be terminal ethylenic unsaturation, i.e. where the ethylenically unsaturated group(s) are positioned on the end of a polyester chain(s).

The polyester of the invention may suitably comprise from 0.05 to 0.6 moles, preferably from 0.1 to 0.4 moles of ethylenic double bonds per 100 g of polyester, at least a proportion of which should preferably be terminal ethylenic unsaturation.

The polyester of the invention preferably has a molecular weight in the range 500 to 30,000, more preferably in the range 1000 to 10,000.

The water dispersible polyesters of the invention may be used in the preparation of aqueous, at least non-ionically stabilised, polyester dispersions.

The polyesters of the invention may be dispersed in water using conventional techniques well known in the art for producing such dispersions. For example, dispersion may be carried out by adding the polyester to water with agitation, for example, by effecting the dispersion in an apparatus which is capable of providing high shear. Alternatively, water may be stirred into the polyester. Dispersion may also be effected by adding water to a solution of the polyester in an organic solvent (which may be residual organic solvent remaining from the processes employed to prepare the polyester, or solvent specifically added for the purpose) with stirring. After removal of the organic solvent by distillation an aqueous dispersion of the polyester remains. Alternatively, dispersion may be carried out in the presence of very small quantities of organic solvents to act as plasticising agents, again with agitation.

The aqueous polyester dispersions of the invention will typically have a percentage solids content in the range of from 10 to 60% by weight based on the total weight of the aqueous dispersion. Preferably the solids content will be in the range of from 25 to 50% by weight.

Where the polyester of the invention comprises ethylenic unsaturation, curing may be effected by exposing the polyester to a suitable electromagnetic radiation source, such as UV (ultra-violet) or visible radiation, or a high energy electron beam.

In preferred embodiments curing is effected by means of UV or visible electromagnetic radiation in the presence of a free-radical generating photoinitiator which will normally have been dispersed in the aqueous polyester dispersion. Suitable photoinitiators may be selected from any of the free-radical generating photoinitiators that are commonly used in the art. The amount of photoinitiator will normally be in the range of 0 to 10% by weight, based on the dry weight of the polyester in the aqueous dispersion. If used (as is preferred), it is normally present in an amount of 0.3 to 5%, preferably 0.5 to 3%, by weight.

The polyester compositions of the invention may contain a polyethylenically unsaturated cross-linking material having two or more carbon to carbon double bonds which can each (i.e. separately) take part in a radiation induced addition polymerisation reaction. The cross-linking material will normally be dispersed in the aqueous polyester dispersion, and may be polymerised on exposure to the kinds of radiation sources that have been discussed supra. When UV or visible electromagnetic radiation is employed, a photoinitiator is usually necessary which will also normally be dispersed in the aqueous polyester dispersion. The presence of a cross-linking material is particularly desirable when the polyester is a radiation curable polyester (i.e. contains ethylenic unsaturation which is capable of undergoing a radiation induced polymerisation reaction). The cross-linking material may be polymeric, oligomeric or monomeric in nature, but is preferably monomeric in nature. Suitable examples of cross-linking materials include trimethylol propane triacrylate, 1,3-butylene glycol dimethacrylate, ethylene glycol diacrylate, ethylene glycol dimethacrylate, Bisphenol-A-dimethacrylate, diethylene glycol dimethacrylate, pentaerythritol triacrylate, pentaerythritol tetraacrylate, triethylene glycol dimethacrylate, trimethylene glycol dimethacrylate, trimethylol propane triacrylate, triethoxylated trimethylol propane triacrylate, tetraethylene glycol diacrylate, ethoxylated Bisphenol-A-dimethacrylate, allyl acrylate, allyl crotonate, allyl methacrylate, diallyl acrylate, diallyl fumarate, diallyl malate, diallyl maleate, diallyl phthalate, diallyl-oxyethyl methacrylate, melamine acrylate, triallyl-5-triazine, vinyl trialloxy silane, triallyl cyanurate, 1,6-hexanediol diacrylate, divinyl benzene, diallyl amine, trimethylol propane dimethyl ether, and diallyl maleate methacrylate. When the aqueous polyester dispersions of the invention also comprise a polyethylenically unsaturated cross-linking material, it will suitably be present in an amount of up to 35% by weight, based on the dry weight of the polyester in the dispersion. More usually, the aqueous polyester dispersions will contain from 2 to 30% by weight, and particularly 5 to 20% by weight of the polyethylenically unsaturated cross-linking material where such a material is present.

Accordingly, a further preferred aspect of the present invention provides an aqueous polymer dispersion comprising:

(i) a water dispersible polyester polymer comprising one or more polyester chains and one or more non-ionic polyoxyalkylene chains in which at least 40% of the repeating oxyalkylene units are oxyethylene units, said polyester polymer having a structure in which one or more of the polyoxyalkylene chains are pendent to at least one of the polyester chains and wherein one or more of the polyester chains comprises radiation curable ethylenic unsaturation; and (ii) at least one photoinitiator activatable by a source of electromagnetic radiation.

The water dispersible polyesters of the invention and the aqueous, at least non-ionically stabilised, polyester dispersions derived therefrom may find applicability in a wide range of industrial fields. In particular, the aqueous polyester dispersions may be advantageously employed as surface coating compositions, for example, in paints, lacquers and varnishes, or as a component in a printing ink.

As surface coating compositions they may be applied to any substrate including metallic and non-metallic substrates such as wood, glass, cloth, leather, paper, plastics, foam and the like, by any conventional coating technique including brushing, dipping, flow coating, spraying, roller coating and the like. The compositions may contain other conventional ingredients such as pigments, dyes, emulsifiers, surfactants, thickeners, heat stabilisers, levelling agents, anti-cratering agents, fillers, sedimentation inhibitors, UV absorbers, antioxidants, fire retardants and the like introduced at any stage of the production process or subsequently. The surface coatings once applied may be dried at ambient temperature, or the drying process may be accelerated by heat.

The aqueous, non-ionically and optionally anionically stabilised polyester dispersions of the invention, are particularly suitable as surface coating compositions when the water-dispersible polyester of the invention additionally comprises ethylenic unsaturation (at least part of which should preferably be terminal ethylenic unsaturation) which enables the coating once applied to be radiation cured. For this purpose, the surface coating compositions preferably comprise a photoinitiator and a polyethylenically unsaturated cross-linking material. The surface coatings are normally allowed to dry before exposure to a suitable radiation source.

The present invention is now illustrated, but not limited, by the following examples.

EXAMPLE 1

A hydroxyl terminated, ethylenically unsaturated, polyester precursor polymer having a molecular weight of about 3000 was prepared by reacting the monomers neopentyl glycol (56.12 g; 0.54 moles), itaconic acid (9.75 g; 0.075 moles) and adipic acid (58.84 g; 0.403 moles). The monomers were heated in a melt at 200° C. for 6 hours in the presence of an antimony (III) oxide catalyst, the eliminated water being removed by distillation. After the reaction was complete a vacuum was applied to remove the residual traces of water.

The polyester precursor polymer (75.5 g which contained 0.0441 moles of polymerised units derived from itaconic acid) was then reacted with 35 g (0.035 moles) of Jeffamine M-1000 at 100° C. After 2 hours the reaction was complete and the polyester polymer with its pendent polyoxyalkylene side chains was poured into water under high shear to give an aqueous polyester dispersion which had a 30% solids content and an average particle size of 0.033 microns. The aqueous polyester dispersion demonstrated good stability.

EXAMPLE 2

A hydroxyl terminated, ethylenically unsaturated, polyester precursor polymer bearing carboxylic acid side groups was prepared using the same method as for Example 1 from the following monomers in the following amounts.

|  | Moles | Weight (grams) |
| --- | --- | --- |
| Neopentyl glycol | 0.505 | 52.52 |
| Dimethylol propionic acid | 0.06 | 8.04 |
| Fumaric acid | 0.125 | 14.50 |

|   | Moles | Weight (grams) |
|---|---|---|
| Adipic acid | 0.356 | 51.98 |

The polyester precursor polymer was then reacted with Jeffamine M-1000 at 100° C. to yield a water dispersible polyester comprising pendent polyoxyalkylene side chains and carboxylic acid side groups. The carboxyl groups were then neutralised with triethylamine, and the polyester was poured into water under high shear to give an aqueous polyester dispersion which had a 30% solids content. The aqueous polyester dispersion demonstrated good stability.

EXAMPLE 3

This example illustrates the preparation of a branched polyester having carboxylic acid side groups, terminal ethylenic unsaturation and pendent polyoxyalkylene chains.

A branched polyester polyol was prepared from the monomers neopentyl glycol, adipic acid and trimethylol propane using the polyesterification procedure described in Example 1. A polyester polyol having an acid number of 22 mgKOH/g and a hydroxyl number of 220 mgKOH/g was prepared. Trimellitic anhydride (36.7 g) was then added to 500 g of the polyester polyol and the mixture was heated at 140° C. for two hours to give a clear polyester polymer melt with an acid number of 61 mgKOH/g.

N-methylol acrylamide (153 g), toluene (300 ml) and 2,6-di-tert-butyl-4-methylphenol (Topanol O) (2.0 g) were added to the polyester polymer at about 120° C. and the water of reaction removed azeotropically. After about four hours the toluene was stripped off by distillation under reduced pressure to give a polyester precursor polymer with an acid number of 45 mgKOH/g.

Jeffamine M-1000 (35 g) was added to a melt of the polyester precursor polymer at 80° C. and the mixture stirred at this temperature for one hour. Isopropyl alcohol (100 ml) was then added to the polyester polymer at 80° C. with stirring.

The polyester polymer solution at 80° C. was dispersed in distilled water (1690 ml) under high shear with simultaneous addition of sufficient dimethyl ethanolamine to neutralise the carboxylic acid groups and give a final pH of 7.5. The final aqueous polyester dispersion had a 30% solids content and demonstrated improved storage stability (stable after 2 days at 52° C.) compared to a dispersion of an equivalent polyester minus the polyoxyalkylene chains (dispersion flocculated in less than 12 hours at 52° C.).

A photoinitiator (Irgacure 651 available from Ciba Geigy) (0.6 g) in isopropyl alcohol (2 ml) was added to the polyester dispersion and the resulting dispersion was used to cast a wet film 100 microns thick onto a glass plate. The film was dried at 52° C. for 15 minutes and was finally cured under a high pressure mercury lamp. A glossy, flexible, tack-free film was produced.

EXAMPLE 4

This example illustrates the preparation of a branched polyester having sulphonic acid side groups in addition to the pendent polyoxyalkylene chains.

A polyester polymer having an acid value of 18 mgKOH/g was formed by the melt esterification of neopentyl glycol (3.73 moles), adipic acid (1.70 moles), trimethylol propane (1.24 moles), isophthalic acid (2.40 moles) and 5-sodio-sulpho isophthalic acid (0.25 moles).

N-methylol acrylamide (2.87 moles), toluene (300 ml), and Topanol O (3.0 g) were added to the polymer at about 120° C. and the water of reaction removed azeotropically. After four hours the temperature was reduced to 100° C. and Jeffamine M-1000 (0.3 moles) was then added to the reaction mixture. The reaction mixture was stirred at this temperature for two hours, after which the toluene was removed by distillation under reduced pressure.

Isopropyl alcohol (200 ml) and water (200 ml) were then added to the polyester polymer at 100° C. with stirring. The resulting pre-dispersion was dispersed in distilled water at 80° C. under high shear to give an aqueous polyester dispersion having a 35% solids content. The aqueous polyester dispersion demonstrated good stability.

Jeffamine M-1000 has the formula:

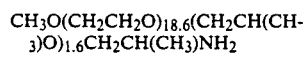

$$CH_3O(CH_2CH_2O)_{18.6}(CH_2CH(CH_3)O)_{1.6}CH_2CH(CH_3)NH_2$$

We claim:

1. A water dispersible polyester polymer comprising one or more polyester chains and one or more non-ionic polyoxyalkylene chains in which at least 40% of the repeating oxyalkylene units are oxyethylene units, said polyester polymer having a structure in which one or more of the polyoxyalkylene chains are pendent to at least one of the polyester chains.

2. A water dispersible polyester polymer as claimed in claim 1 comprising a plurality of polyester chains bonded together to form a branched polyester structure in which at least one of the polyester chains is provided with at least one polyoxyalkylene chain.

3. A water dispersible polyester polymer as claimed in claim 2 wherein the polyester comprises at least one polyester chain to which is attached at least one polyoxyalkylene chain as a side chain(s) thereof.

4. A water dispersible polyester polymer as claimed in claim 2 or claim 3 wherein the polyester comprises at least one polyester chain having a polyoxyalkylene chain attached to an end thereof, which polyester chain is pendent to another polyester chain.

5. A water dispersible polyester polymer as claimed in claim 1 comprising a single polyester chain onto which is attached one or more pendent polyoxyalkylene side chains.

6. A water dispersible polyester polymer as claimed in claim 1 wherein at least 80% of the oxyalkylene units in the polyoxyalkylene chain(s) are oxyethylene units.

7. A water dispersible polyester polymer as claimed in claim 1 which additionally comprises acid groups arranged as side groups bonded to the polyester chain(s).

8. A water dispersible polyester polymer as claimed in claim 7 wherein the acid groups are one or both of carboxylic acid groups and sulphonic acid groups.

9. A water dispersible polyester polymer as claimed in claim 7 wherein at least a proportion of the acid groups have been converted to anionic salt groups.

10. A water dispersible polyester polymer as claimed in claim 1 which additionally comprises radiation curable ethylenic unsaturation on the polyester chain(s).

11. A water dispersible polyester polymer as claimed in claim 10 wherein at least a proportion of said ethylenic unsaturation is terminal ethylenic unsaturation.

12. A process for preparing a water dispersible polyester polymer as claimed in claim 1, said process comprising at least the steps of:
(A) preparing a polyester precursor polymer having one or more reactive functional groups and polymerised units derived from esterifiable monomers; and
(B) incorporation of the polyoxyalkylene chain(s) by reacting the polyester precursor polymer with a compound having a polyoxyalkylene chain and a reactive functional group which is co-reactive with the reactive functional group(s) of the polyester precursor polymer.

13. A process as claimed in claim 12 wherein step (A) provides for the preparation of a polyester precursor polymer comprising one or more ethylenically unsaturated groups and step (B) provides for incorporation of the polyoxyalkylene chain(s) by reacting the ethylenically unsaturated polyester precursor polymer with a compound(s) containing a polyoxyalkylene chain and a Michael donor group which is co-reactive with the ethylenically unsaturated group(s) of the polyester precursor polymer.

14. A process for preparing a water dispersible polyester polymer comprising one or more polyester chains and one or more non-ionic polyoxyalkylene chains in which at least 40% of the repeating oxyalkylene units are oxyethylene units, said polyester polymer having a structure in which one or more of the polyoxyalkylene chains are pendent to at least one of the polyester chains, said process comprising at least the steps of:
(A) preparing a polyester precursor polymer comprising one or more reactive functional groups and polymerised units derived from esterifiable monomers; and
(B) incorporation of the polyoxyalkylene chain(s) by reacting the polyester precursor polymer with a compound having a polyoxyalkylene chain and a reactive functional group which is co-reactive with the reactive functional group(s) of the polyester precursor polymer.

15. A process as claimed in claim 14 wherein step (A) provides for the preparation of a polyester precursor polymer comprising one or more ethylenically unsaturated groups and step (B) provides for incorporation of the polyoxyalkylene chain(s) by reacting the ethylenically unsaturated polyester precursor polymer with a compound(s) containing a polyoxyalkylene chain and a Michael donor group which is co-reactive with the ethylenically unsaturated group(s) of the polyester precursor polymer.

16. A process as claimed in claim 15 wherein at least one of the esterifiable monomers employed in the preparation of the polyester precursor polymer in step (A) is a chain branching monomer having three or more esterifiable functional groups.

17. A process as claimed in claim 16 wherein step (A) provides for the preparation of a branched polyester precursor polymer comprising terminal ethylenic unsaturation.

18. A process as claimed in claim 17 wherein step (A) comprises two stages, in a first stage of which a branched polyester polymer is prepared and in a second stage of which the branched polyester from the first stage is subjected to a post-functionalisation reaction with an ethylenically unsaturated compound to introduce terminal ethylenic unsaturation.

19. A process as claimed in any one of claims 15 to 18 wherein step (A) provides for the preparation of a polyester precursor polymer comprising pendent and/or in-chain ethylenic unsaturation.

20. A process as claimed in claim 15 wherein only a proportion of the ethylenically unsaturated groups of the polyester precursor polymer prepared in step (A) are reacted in step (B) to incorporate the polyoxyalkylene chain(s).

21. A process as claimed in claim 15 wherein the compound comprising the polyoxyalkylene chain and the Michael donor group which is reacted with the ethylenically unsaturated polyester precursor polymer in step (B) is a polyether amine containing oxyalkylene residues.

22. A process as claimed in claim 21 wherein the polyether amine has the formula:

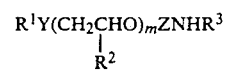

wherein
$R^1$ is hydrogen or a monovalent hydrocarbon radical containing 1-12 carbon atoms;
$R^2$ is hydrogen or a mixture thereof with methyl and/or ethyl, providing at least 40% of the $R^2$ substituents are hydrogen;
$R^3$ is hydrogen or a monovalent hydrocarbon radical containing 1 to 12 carbon atoms;
Y is —O— or a group of the formula —N($R^4$)— in which $R^4$ is hydrogen or a monovalent hydrocarbon radical containing 1-12 carbon atoms;
m is an integer from 5 to 150; and
Z is an alkylene radical containing 2-4 carbon atoms.

23. A process as claimed in claim 22 wherein Z is 1,2-propylene, Y is oxygen and $R^3$ is hydrogen.

24. A process as claimed in claim 23 wherein at least one of the esterifiable monomers employed in the preparation of the polyester precursor polymer in step (A) is a monomer comprising at least two functional groups which will readily undergo an ester condensation reaction and at least one carboxylic acid group which is more difficult to esterify.

25. A process as claimed in claim 15 wherein at least one of the esterifiable monomers employed in the preparation of the polyester precursor polymer in step (A) is a monomer comprising at least two esterifiable functional groups and at least one sulphonic acid group.

26. An aqueous polymer dispersion comprising the water dispersible polyester claimed in claim 1 to 11.

27. An aqueous polymer dispersion as claimed in claim 26 wherein the dispersion comprises a polyethylenically unsaturated cross-linking material.

28. An aqueous polymer dispersion as claimed in claim 27 wherein the dispersion further comprises a photoinitiator.

29. An aqueous dispersion of a water dispersible polyester polymer comprising one or more polyester chains and one or more non-ionic polyoxyalkylene chains in which at least 40% of the repeating oxyalkylene units are oxyethylene units, said polyester polymer having a structure in which one or more of the polyoxyalkylene chains are pendent to at least one of the polyester chains.

30. An aqueous dispersion as claimed in claim 29 wherein the polyester polymer additionally comprises radiation curable ethylenic unsaturation on the polyester chain(s).

31. An aqueous dispersion as claimed in claim 30 wherein the polyester polymer additionally comprises acid groups arranged as side groups bonded to the polyester chain(s).

32. An aqueous dispersion as claimed in claim 31 wherein at least a proportion of the acid groups on the polyester chain(s) have been converted to anionic salt groups.

33. An aqueous dispersion as claimed in claim 30 which additionally comprises a photoinitiator.

34. An aqueous dispersion as claimed in claim 30 which additionally comprises a polyethylenically unsaturated cross-linking material.

35. A coating composition comprising an aqueous dispersion of a water dispersible polyester polymer as claimed in claim 29.

36. A substrate provided with a coating derived from the coating composition claimed in claim 35.

* * * * *